United States Patent
Fiore, Jr. et al.

(10) Patent No.: US 6,880,698 B2
(45) Date of Patent: Apr. 19, 2005

(54) ARROW CASE

(75) Inventors: Joseph F. Fiore, Jr., Lebanon, PA (US); John J. Hagemann, Plano, IL (US); John Whalen, Sheridan, IL (US)

(73) Assignee: Plano Molding Company, Plano, IL (US)

( * ) Notice: Subject to any disclaimer, the term of this patent is extended or adjusted under 35 U.S.C. 154(b) by 197 days.

(21) Appl. No.: 10/315,310

(22) Filed: Dec. 10, 2002

(65) Prior Publication Data

US 2003/0106818 A1 Jun. 12, 2003

Related U.S. Application Data

(63) Continuation-in-part of application No. 10/120,194, filed on Apr. 10, 2002, now abandoned, which is a continuation of application No. 09/694,187, filed on Oct. 23, 2000, now Pat. No. 6,390,294.

(51) Int. Cl.$^7$ .......................... B65D 85/00; F41B 5/22; E05C 19/10
(52) U.S. Cl. .................. 206/315.11; 220/324; 292/249
(58) Field of Search .................... 206/315.11; 124/25.7, 124/86; 211/60.1; 224/916; D3/269; 220/653, 324; 292/249

(56) References Cited

U.S. PATENT DOCUMENTS

| | | | |
|---|---|---|---|
| 3,088,583 A | 5/1963 | Holtz | |
| 3,337,028 A | 8/1967 | Glavan | |
| 3,351,270 A | 11/1967 | Hohnjec | |
| 3,421,682 A | 1/1969 | Eisenbach | |
| D246,138 S | 10/1977 | Christensen et al. | |
| 4,244,612 A | * 1/1981 | Schurman | 292/249 |
| 4,854,476 A | 8/1989 | Serio, Jr. | |
| 5,242,050 A | 9/1993 | Billings | |
| D343,057 S | 1/1994 | Dickinson | |
| 5,456,379 A | 10/1995 | Krupa et al. | |
| 5,505,328 A | * 4/1996 | Stribiak | 220/4.22 |
| 5,775,313 A | 7/1998 | Bresette et al. | |
| 5,803,069 A | 9/1998 | Schreiber | |
| 5,848,718 A | 12/1998 | Colwell | |
| 6,193,089 B1 | 2/2001 | Yu | |
| 6,390,294 B1 | * 5/2002 | Fiore et al. | 206/315.11 |
| 6,571,946 B2 | * 6/2003 | Fiore, Jr. | 206/315.11 |
| 2003/0221982 A1 | * 12/2003 | Cook et al. | 206/315.11 |

OTHER PUBLICATIONS

Doskocil Mfg. Co. 1995 Gun Guard Quality Sporting Cases Catalog, p. 13 (Archery Edition).
Woodstream (an EKCO Group Company) 1991 Hunting and Shooting Accessories Catalog (Inside cover—Field Locker), p. 2.
Kolpin Mfg., Inc. 1997 Hunting Products Catalog, p. 15 (Gator Hard–Sided Bow Cases).

* cited by examiner

Primary Examiner—Bryon P. Gehman
(74) Attorney, Agent, or Firm—Vedder, Price, Kaufman & Kammholz

(57) ABSTRACT

A case for archery equipment includes, interengaging first and second case sections connected for relative movement between open and closed positions. The first and second case sections each include a wall for cooperatively defining an interior compartment when disposed in the closed position. The first and second case sections each including a set of reinforcing pillars which project into interior compartment. Each reinforcing pillar having a free end such that the free end of each reinforcing pillar affixed to the first case section is aligned with and engages the free end of one of the reinforcing pillars on the second case section. Each set of reinforcing pillars on the first and second case sections including at least one reinforcing pillar having an engaging contour including a first element portion and a complimentarily shaped second element portion.

23 Claims, 6 Drawing Sheets

ARROW CASE

This is a continuation-in-part of application Ser. No. 10/120,194, filed Apr. 10, 2002, now abandoned, which is a continuation of application Ser. No. 09/694,187, filed Oct. 23, 2000 now U.S. Pat. No. 6,390,294.

BACKGROUND OF THE INVENTION

The present invention relates generally to a case for archery equipment, and more particularly, to a molded, protective case which is adapted for easy, low-cost mass production manufacture and which prevents damage to the equipment stored therein, by even distribution of loads and forces thereupon.

Transporting archery equipment, such as bows and arrows, has historically been a difficult undertaking. By their very nature, archery equipment is large and cumbersome. The equipment is also delicate relative to its size. In particular, modern bows have very complex structure in order to provide the sophisticated functions now expected. While a bow may be disassembled for transportation, it is considered a major disadvantage if this is necessary. Accuracy and alignment is lost if these bows are disassembled.

Furthermore, the bows and arrows are also very delicate when subjected to forces different from those of ordinary operation. Slight or unseen damage to bows can result in catastrophic failure of the equipment, which could even injure the user. Arrow shafts are preferably made from very thin wall aluminum tubing or carbon fiber. The slightest tweak, curve or bend in an aluminum arrow shaft will cause the arrow to fly off course when in use. An off-axis impact can destroy a carbon fiber arrow shaft. Consequently, it is advantageous to use a protective case which can prevent any damage to the archery implements therein from forces and loads applied thereto.

Current standard protective enclosures include fabric, soft-sided, padded cases, and traditional, rectangular suitcase-style cases. For many reasons, there are obvious disadvantages to the soft-sided cases. First, and foremost, is the lack of protection afforded the equipment inside. These cases are useful only in that all of the equipment may be transported in one case. As a result, they have rather limited usefulness for serious archers, or those concerned about the condition of their equipment. Accordingly, they are priced on the lower end of the scale. It should be appreciated that although the sides of the case are padded, the large side panels easily deform when subjected to external loads or forces and only protect the equipment from abrasion or minimal force impacts, such as setting the case down. Without a stiff exterior panel, the level of protection afforded is only sufficient for the infrequent or occasional user. These soft cases are not approved for use in airplane travel.

The traditional suitcase design for archery equipment provides more protection for the contents. Commonly, their construction includes a plastic or composite shell having cooperative extruded metal bands affixed about the perimeter of each half of the shell, and a metal piano-style hinge joining the halves together. One disadvantage is the size of such a case. Available only in conventional rectangular-shaped designs, there is a considerable amount of extra space that is not used which renders the case cumbersome arid unwieldy. Another major disadvantage is the sizable planar side panels. The shape of a bow requires a case with large side panels relative to the other end panels. As a result, the sides of the case easily deform inward when subjected to an external load or force. The side panels of such known cases are not designed to absorb or distribute significant impact forces. The perimeter edges are designed to carry the loads. The metal bands are easily damaged and misalignment is common. As a result, known suitcase designs permit deformation of the side panels to the extent that the bow and/or arrows can be damaged, and create haphazard load distributions.

The advent of carbon fiber arrow shafts resulted in a lighter, stiffer arrow with a much thinner shaft. Previous quiver or arrow holder designs produced over the last 40-plus years are sized for the much larger aluminum arrow shafts. As a result, they are unable to properly secure the carbon fiber arrows in position for transportation or use. Consequently, archers must purchase a quiver for each type of arrow shaft, totally convert to the new arrow shafts, or not use the new arrow shaft. Other types and kinds of arrow holders have faced similar disadvantages.

Transporting or storing bows inside either of the above prior art cases has obvious disadvantages; namely, the inability to ensure proper alignment and to protect the bow from damage by external forces. Consequently, all previous design attempts to provide an adequate protective enclosure have failed. Likewise, transporting or storing arrows inside the above-described cases has obvious disadvantages, namely, the inability to protect the arrow shafts from bending or breaking due to their weak designs. Consequently, all previous design attempts to incorporate an arrow holder with or inside a case have failed to provide adequate protection.

Therefore, there is a significant demand for a durable, protective case for safely transporting or storing archery equipment which provides the advantages of low-cost, high-strength, impact-resistant, load distributing, automatic aligning and multi-functional use.

SUMMARY OF THE INVENTION

It is therefore a general object of the present invention to provide a protective case for the transportation and/or storage of archery equipment which is inexpensive, yet impact resistant, non-deformable, sturdy and durable.

Another object of the present invention is to provide a case which has an interior cavity dimensioned to receive a plurality of arrows.

Yet another object of the present invention is to provide a protective case which resists and distributes deforming forces impacting on the comparatively large panels.

Still another object of the present invention is to provide a protective case with reinforcing pillars which brace and prevent the comparatively large panels from significantly deforming from their original location.

Another further object of the present invention is to provide a protective case with integrally molded reinforcing pillars which cooperate to prevent deformation of the comparatively large panels by effectively reducing the flexibility of the large panels and distributing any loads or forces impinging on the case.

Yet another further object of the present invention is to provide a case with an integrally molded reinforcing pillars formed in each section of the enclosure which cooperate and engage when the case is in a closed position to reduce the flexibility of the large panels of the case from damaging deformation and to distribute any loads or forces impinging on the case.

Still yet another further object of the present invention is to provide a protective case for the transportation and/or storage or archery equipment which has an inexpensive, easy to manufacture, integratable, and simple-to-use arrow holder for use in connection with differently sized arrows.

In one principal aspect of the present invention, a case for archery equipment includes engaging first and second case sections connected for relative movement between open and closed positions. The first and second case sections each include a wall for cooperatively defining an interior compartment when the first and second case sections are disposed in the closed position.

The interior compartment is adapted to receive archery equipment. The first and second case sections each include a set of reinforcing pillars affixed thereto which project into the interior compartment when the first and second case sections are disposed in the closed position. Each reinforcing pillar has a free end such that the free end of each reinforcing pillar affixed to the first case section is aligned with and engages the free end of one of the reinforcing pillars affixed to the second case section when the first and second case sections are disposed in the closed position.

Each set of reinforcing pillars on the first and second case sections includes at least one reinforcing pillar having a first contour element and a complimentarily-shaped second contour element formed on the free end thereof. When the first and second case sections are disposed in the closing position, each first contour element disposed in the first and second case section is aligned and in registry with one second contour elements disposed on the first and second case sections.

In another principal aspect of the present invention, a case includes first and second case sections connected for movement between open and closed positions which jointly define an interior compartment when disposed in the closed position. Each of the case sections has a reinforcing pillar affixed thereto which projects into the compartment when the case sections are disposed in the closed position. Each pillar has a free end configured to define juxtaposed first and second contour elements formed on the free end. The pillars of the first and second case sections are disposed and oriented such that, when the case sections are in the closed position, the respective free ends thereof are aligned and the first and second contour elements are disposed in meshing registry.

In yet another principal aspect of the present invention, a case includes a first case section and a second case section joined together to move between an open position and a closed position. The first and second case sections cooperatively define an interior compartment when disposed in the closed position. A plurality of pillars are affixed to each of the first and second case sections to project into the interior compartment when the first and second case sections are disposed in the closed position. Each of the pillars has a free end portion. The pillars ate disposed and configured such that each of the free end portions of the pillars affixed to the first case section engage one of the free end portions of the pillars affixed to the second case section to define a plurality of engaging pillars sets when the first and second case sections are disposed in the closed position. At least one of the plurality of the engaging pillar sets includes congruent pillars having both first and second contour elements.

In still another principal aspect of the present invention, a case includes a first case section an a second case section joined together to move between and open position and a closed position. The first and second case sections cooperatively define an interior compartment when disposed in the closed position. Each of the first and second case sections having at least one removable, reversible latch assembly including a bar disposed on each of the first and second case sections. The bars are disposed in parallel relation. A latch arm is connected to one of the bars and further includes a latch element which is operatively connectable with the other of the bars to retain the first and second case sections in the closed position.

These and other objects, features and advantages of the present invention will be clearly understood through consideration of the following detailed description.

BRIEF DESCRIPTION OF THE DRAWINGS

In the course of the following detailed description, reference will be made to the attached drawings wherein like reference numerals identify like parts and in which.

DETAILED DESCRIPTION OF A PREFERRED EMBODIMENT

Figure 1:
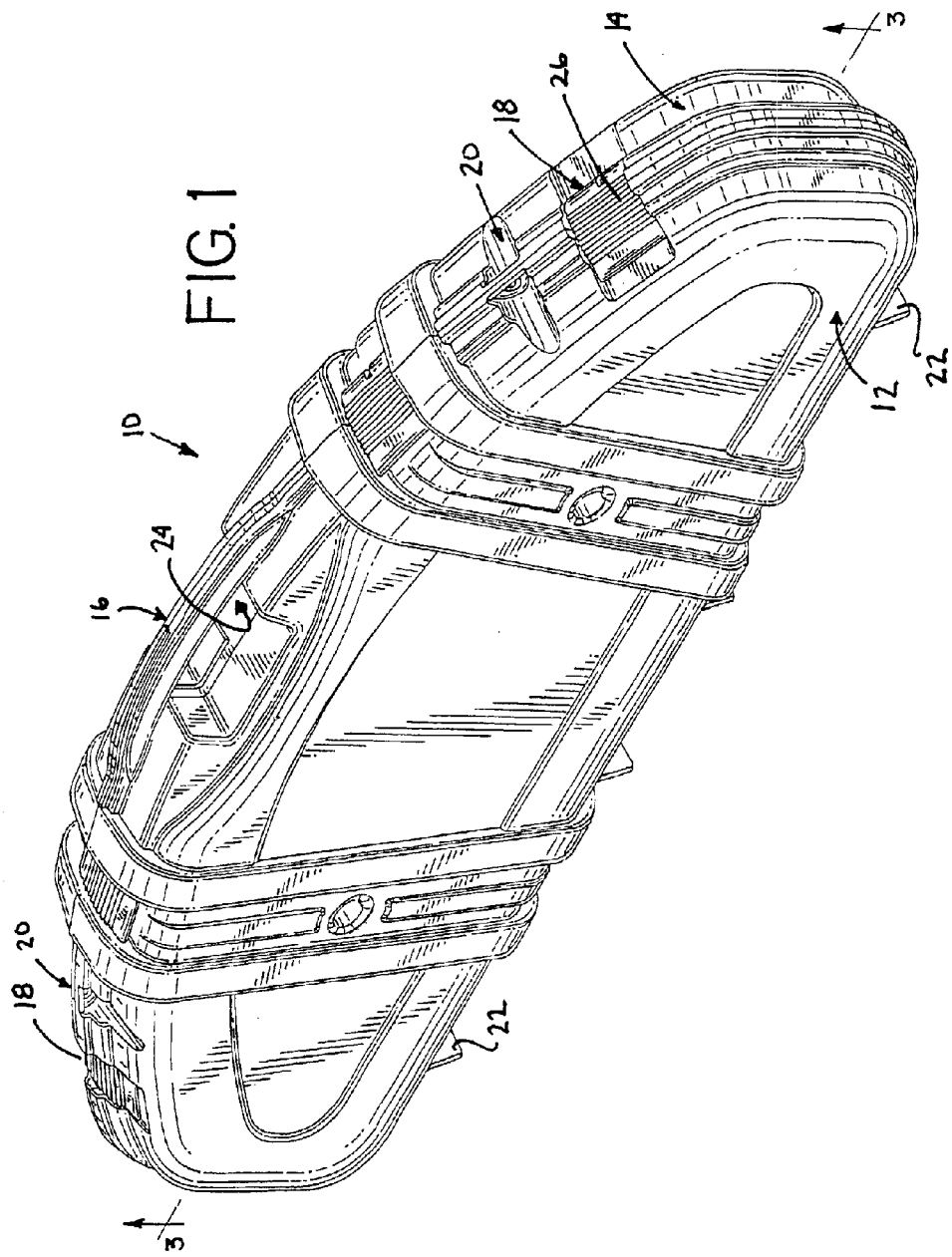
FIG. 1 is a perspective view of the case for archery equipment constructed in a closed position in accordance with the principles of the present invention.

One embodiment of the present invention relates to a protective case for transporting and/or storing archery implements, preferably at least a bow and a plurality of arrows. Generally, the case 10 of this embodiment of the present invention, shown in FIGS. 1–5, includes interengaging case sections, a first case section 12 and a second case section 14 which are interconnected along a hinge line for movement between an open position, FIG. 2, and a closed position, FIGS. 1 and 3. As shown in FIG. 1, the case 10 also includes a handle 16, a plurality of latching devices 18, locking members 20, and a plurality of feet 22.

The handle 16 is formed by cooperation of the first case section 12 and the second case section 14. A passage 24 is defined below the handle 16 for receiving the hand or fingers of an operator in order to carry or move the case 10. Each latching device 18 in FIG. 2 includes an arm 26 and a catch 28. The arm 26 is removably secured to the case 10, and preferably to the second case section 14. The preferred structural components of the arm 26 include a release lever 30 and an engagement finger 32. The catch 28 is preferably formed on the first case section 12 and contacts the engagement finger 32 when the arm 26 is moved into a latching position as illustrated in FIG. 1. Pressure applied to the arm 26 results in engagement of the engagement finger 32 with catch 28. The release lever 30 provides a mechanical advantage for an operator to overcome the interlocking forces between the engagement finger 32 and the catch 28 in order to move the case 10 to an open position. It will be recognized by those having ordinary skill in the art that any other presently available, suitable latching devices may be substituted and achieve the identical function.

The locking members 20 are generally bores 34 formed in each of the first and second case sections 12 and 14 which provide a passage through which an operator may insert a conventional locking element (not shown). Preferably, the locking element is a padlock which is opened by key or combination. The case 10 may not be opened without destroying the case 10, if the locking elements are not removed.

A plurality of feet 22 are provided in association with the first and second case sections 12 and 14 such that the case 10 may be oriented in a free-standing vertical position as shown in FIG. 1. These feet 22 assist an operator in transportation of the case by providing a stable base for maintaining the vertical orientation.

Figure 2:
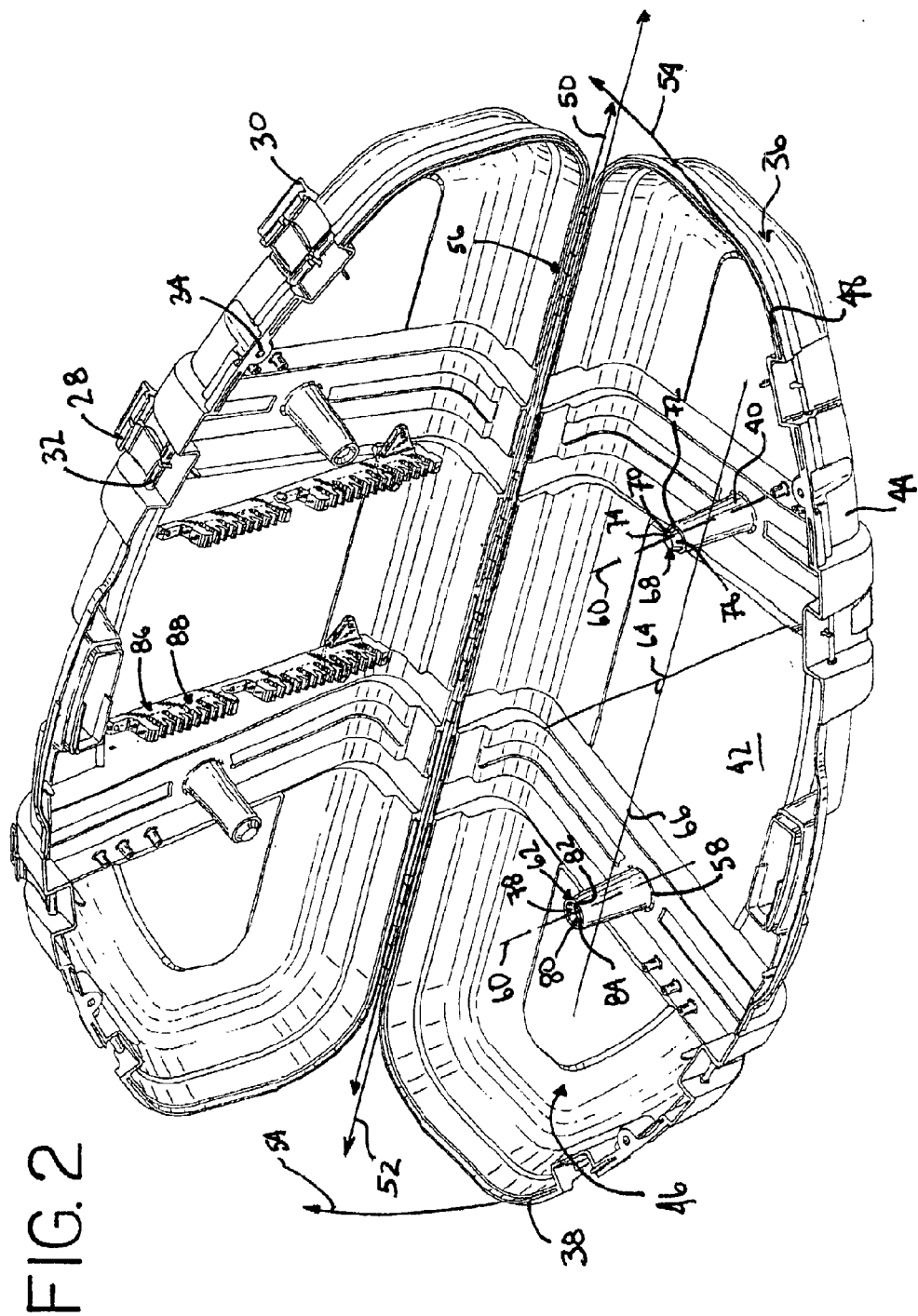
FIG. 2 is a perspective view of the protective enclosure of FIG. 1 in an open position illustrating the interior recesses thereof, and the arrow holders disposed therein.

As shown in FIG. 2, the first case section 12 generally includes a first wall 36, a first mating rim 38, a hinge line 50 and a plurality of first reinforcing pillars 40. The first wall 36 is formed as a shell having a generally tub-like configuration. An interior surface 42 and an exterior surface 44 cooperate to define the first wall 36 and the thickness thereof. The first wall interior surface 42 defines a first interior recess or cavity 46 which is configured and dimensioned to receive an archery bow 11 and/or arrows therein.

The first mating rim 38 is formed as a substantially circumferentially extending edge 48 of the first wall 36. The configuration of the first mating rim 38 generally represents the overall outline of the case 10. Preferably the configuration of the case 10 and mating rim 38 is generally described as a chord, represented by line 52, intersecting an arc, represented by line 58. It will be recognized by those of ordinary skill in the art that the shape or configuration of the case 10 is not limited to the preferred version and is offered by way of example only. The hinge line 50 is generally coincident with the chord line 52. The first hinge structures 56 are disposed at selected positions on the first mating rim 38 along the hinge line 50. The hinge structures are formed integrally with the first case section 12 and may be configured in any of a number of conventional ways. Snap-fit, projection/receptacle, living, and flangely-created hinges may be used or freely substituted as will be recognized by one of ordinary skill in the art.

Figure 3:
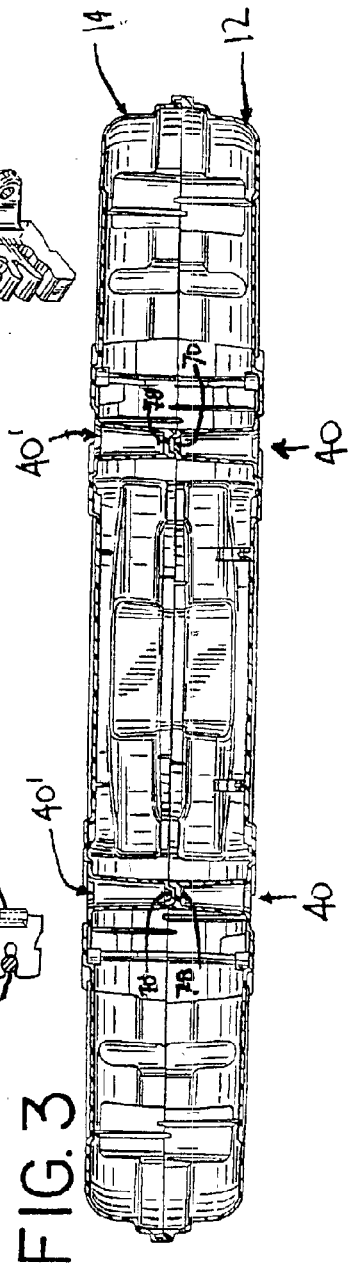
FIG. 3 is a cross-sectional view taken along lines 3—3 of FIG. 1, illustrating the case in a closed position and the reinforcing pillars engaged.

A plurality of first reinforcing pillars 40 are shown in FIGS. 2 and 3. These reinforcing pillars 40 are formed in or integrally molded with the first case section 12. Generally, each reinforcing pillar 40 is configured as a substantially hollow, tubular projection. Specifically, each reinforcing pillar 40 is formed as a hollow truncated cone. A base 58 is disposed adjacent the interior surface 42. The reinforcing pillar 40 extends away from the interior surface 42 a certain extent generally along a longitudinal axis 60 to a free end 62 thereof. Each reinforcing pillar 40 is disposed within the first interior recess or cavity 46. The pair of reinforcing pillars 40 is shown in FIGS. 2 and 3, of one embodiment for the present invention, but those of ordinary skill in the art will recognize and acknowledge that more reinforcing pillars may be added without diverging from the purpose and intent of the subject invention.

Each reinforcing pillar 40 has a first longitudinal axis 60 which is disposed spaced along a common first axis 66 which intersects each first longitudinal axis 60 within and defining a first common plane 64. The common first axis 66 and first common plane 64 are generally parallel to and spaced apart from the hinge line 50.

The free ends 62 of the reinforcing pillars 40 alternately have an engaging feature 68 formed therein. A projection 70 is preferably disposed on one reinforcing pillar 40 and extends away from the shoulder 72 defined at the free end 62 in a generally truncated cone configuration with a top surface 74 disposed at the furthest extent from the interior surface 42. A conical annular surface 76 connects the annular shoulder 72 with the top surface 74. A cavity 78 is preferably formed in the free end 62 of the other reinforcing pillar 40. A shoulder 80 is defined at the free end 62. A bottom surface 82 is connected to the shoulder 80 by an inverted truncated conical annular surface 84 which extends therebetween. It will be recognized by one of ordinary skill in the art that the angle of the conical annular surfaces 76 and 84 are substantially similar.

The second case section 14 is generally a mirror image of the first case section 12, with the exception of the arrow holders 86. Thus, lengthy discussion of the features of the second case section 14 will be avoided by the use of prime element numerals, such as 40' for the plurality of second reinforcing pillars, in order to discuss the second case section 14. It should be noted however, that there are several differences in structure which will be discussed below.

The structural and positional aspects of the reinforcing pillars 40' of the second case section 14 substantially mirror those supports 40 described in the first case section 12, with the following exception. The projection 70' and cavity 78' of the second case section 14 are respectively in alignment and opposition with the cavity 78 and projection 70 of the first case section 12 when the case 10 is in a closed position, see FIG. 3. The cavity 78 and projection 70' and the projection 70 and cavity 78' cooperatively engage thereby connecting the first and second case sections 12 and 14 such that loads applied to the case 10 are evenly distributed. Thus, the contents, namely bow and/or arrows, are not damaged. When the case 10 is in the closed position, the coupled reinforcing pillars 40, 40' also prohibit lateral misalignment of the first and second case sections 12 and 14 whereby the first and second mating rims 38 and 38' are also properly aligned and in opposition.

Figure 5:
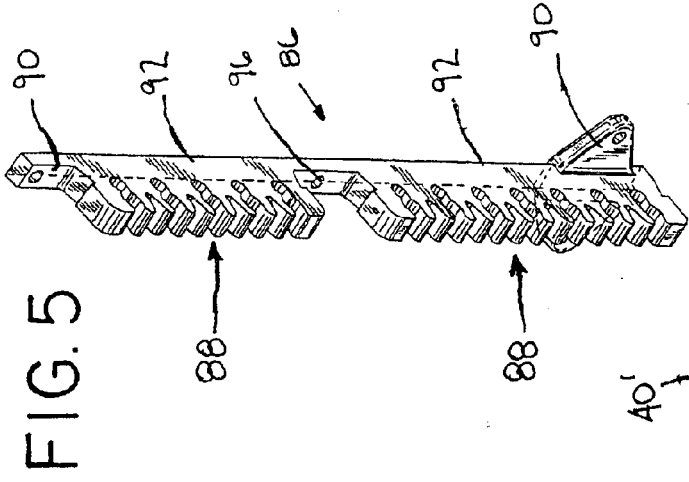
FIG. 5 is a perspective view of the arrow holder of FIG. 4.
Figure 4:
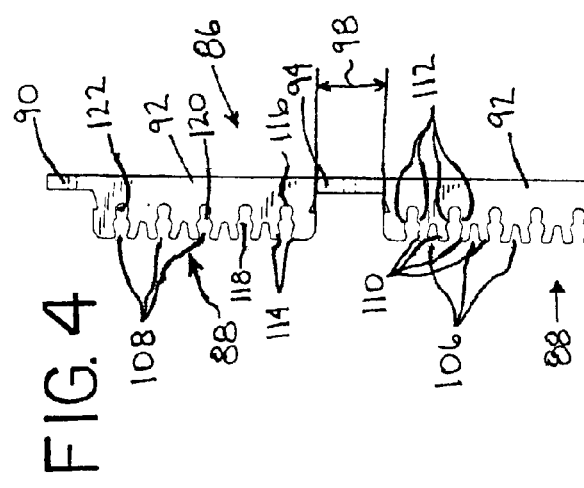
FIG. 4 is a side elevation view of the arrow holder of FIG. 2 constructed in accordance with the principles of the present invention.

A pair of arrow holders 86 are shown in FIG. 2 attached to the second case section 14. Detailed features of the holders 86 are shown in FIGS. 4 and 5. Each arrow holder 86 generally includes a comb-like member 88 and a plurality of mounting flanges 90. The comb member 88 has a pair of base portions 92, each having a plurality of fingers or tines 110 which extend away therefrom to define a plurality of grooves. A mounting element 94 is disposed between the pair of base portions 92 generally formed as a large notch. An aperture 96 is disposed therein for receiving a mounting device to secure the arrow holder 86 to the second case section 14. The aperture 96 is substantially aligned with axis 66 and a width 98 of the notch generally corresponds with the outer diameter 100 of the base end 58' of the reinforcing pillars 40'. Accordingly, arrows 102 do not contact the reinforcing pillars 40'.

The comb member 88 removably mounts a plurality of arrows having a variety of differently sized arrow shafts 104.

A plurality of alternately disposed first and second grooves 106 and 108 are defined between adjacent fingers or tines 110. The arrow shafts 104 interferingly engage the second grooves 108. The first grooves 106 have a first depth represented by the extent of arrow D1, and a first width represented by the arrow W1, which vary along the first depth D1. The extent of the first depth D1 and the extent and variance of the first width W1 in combination with the thickness and durometer of the elastomeric material used to form the comb member determines the amount of flexure of the adjacent fingers that define a first groove 106 toward one another when arrow shaft 104 is inserted into interfering engagement in an adjacent second groove 108.

The second grooves 108 have a second depth represented by the extent of arrow D2, which is greater than the first depth D1, and a second width represented by the arrow W2, which vary along the second depth D2. The second width W2 at the top 114 of the second grooves 108 is greater than the second width W2 at the bottom 116 of the second grooves 108. An intermediate portion 112 of the second grooves 108 has second width W2 less than the second width W2 at the bottom 116 of the second grooves 108. A first chamber 118 is formed near the top 114 of the second grooves 108 generally configured to receive and interferingly engage an arrow shaft 104 having a first diameter D3. The opening to the first chamber 118 is substantially equivalent to the second width W2 at the top 114 of the second grooves 108. The intermediate portions 112 define a lower extent of the first chamber 118 and a passage 120. A second chamber 122 is disposed below the first chamber 118 and communicates therewith by the passage 120. An arrow shaft 104 having a second diameter D4 is interferingly engaged within the second chamber 122 after insertion through the first chamber 118 and the passage 120. The first chamber 118 is larger than the second chamber 122, much like the arrow shaft 104 of a first diameter D3 is larger than the arrow shaft 104 of a second diameter D4.

The mounting flanges 90 are integrally formed or molded from the same elastomeric material as the remainder of the comb member 88. Apertures 124 receive and engage mounting projections molded or formed in the second case section 14. Thus, the comb member 88 is positively retained within the second interior recess.

In use, the case 10 disposed in closed position is opened by pulling the release lever 30 on each latch 18 with sufficient force to overcome the connection force between the engagement finger 32 and the catch 28. Accordingly, each latch 18 may be disconnected. The second case section 14 may then be moved through an arc of at least 180° in order to place the case in an open position. An archery bow 11 may then be secured within the first interior recess 46 for protective storage or transportation. Arrows 102 having arrow shafts 104 of different diameters may be secured in the arrow holder 86 located in the second case section for protective storage or transportation.

In order to protect the contents of the case 10, namely the bow and arrows, the case 10 must be moved into a closed position. The second case section 14 may then be moved about the hinge line 50 until mating contact is made between the reinforcing pillars 40 and 40', and the mating rims 38 and 38'. The projections 70 and 70' engage the corresponding cavities 78' and 78, respectively, in order to automatically align the mating rims 38 and 38'. The latches 18 may then be engaged to secure the first and second case sections 12 and 14 together. Any load or force imparted to the case 10 is then distributed evenly among the reinforcing pillars 40 and 40' and the mating rims 38 and 38'. Advantageously, the mating rims 38 and 38' are prevented from misalignment during an impact or load by the interlocked supports 40 and 40'.

Thus, it will be apparent that the bow case 10 includes a first case section 12 and a second case section 14 connected in clamshell fashion such that the first and second case sections 12 and 14 are moveable between an open position shown in FIG. 2 and a closed position shown in FIGS. 1 and 3. It will be further apparent that the first and second case sections 12, 14 each respectively define interior cavities 46 and 46' which jointly define an interior storage compartment when the case 10 is closed.

Still further, it will be apparent that each of the first and second case sections 12, 14 has a plurality of reinforcing pillars 40, 40' defined as sets of reinforcing pillars affixed to respective first and second case sections 12, 14 to project into the storage compartment when the first and second case sections 12, 14 are closed. The reinforcing pillars 40, 40' have free ends 62, 62'. It will be apparent that each set of reinforcing pillars 40, 40' includes at least one reinforcing pillar configured as a female reinforcing pillar and at least one configured as a male reinforcing pillar, each male pillar being aligned and in registry with a female pillar when the case sections 12, 14 are closed, that the free end 62, 62' of each female reinforcing pillar has a cavity 78, 78' respectively, defining a recessed portion, and the free end 62, 62' of each male reinforcing pillar has a projection 70, 70' respectively, defining a projection portion configured to be snugly received within the recessed portion when the case sections 12, 14 are disposed in a closed position.

Another embodiment of the present invention relates to protected case for transporting and/or storing archery implements, preferably a plurality of arrows. Generally, the case 110 of this embodiment of the present invention is shown in FIGS. 6–11 and includes interengaging case sections. A first case section 112 and a section case section 114 are connected along a hinge line for relative movement between an open position, FIG. 6, and a closed position, FIG. 7.

Figure 7:
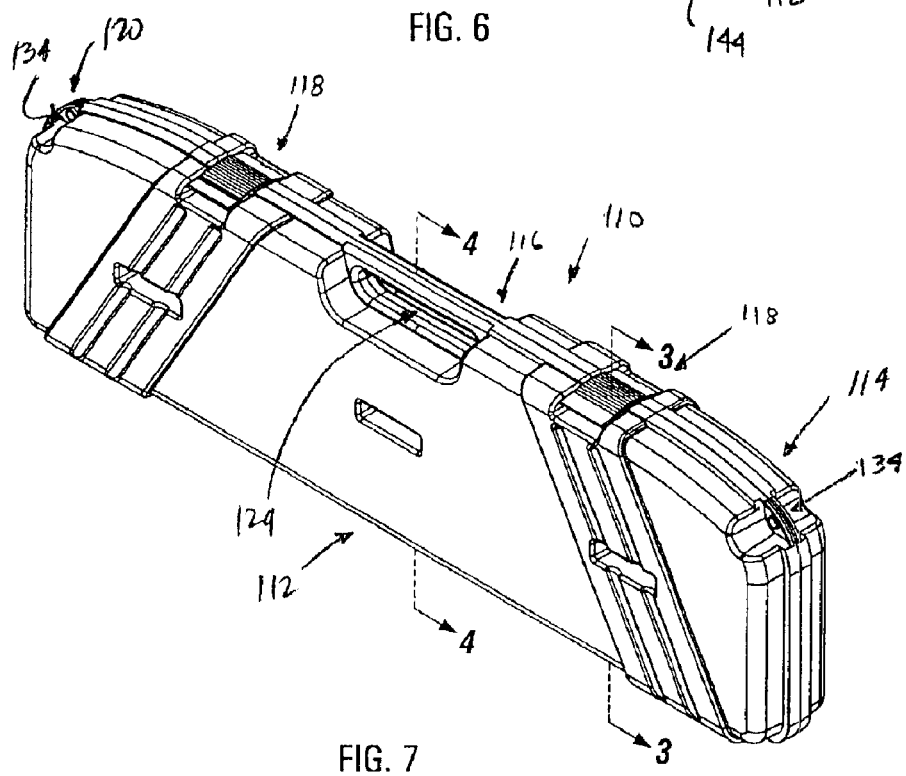
FIG. 7 is a perspective view of the case of FIG. 6 in a closed position.

As shown in FIG. 7, the case 110 also includes a handle 116, a plurality of latching devices 118 and locking members 120. The handle 116 is formed by cooperation of the first case section 112 and the second case section 114. A passage 124 is defined below the handle 116 for receiving the hand or fingers of an operator which enables the operator to carry or move the case 110.

Each latching device 118 is generally configured as a removable and reversible latch assembly including an arm 126 and a catch 128. The arm 126 is removably connected to a bar 127 at one end. At least one such bar 127 is disposed on each of the first and second case sections 112, 114 in parallel relation. The latch assembly is connected to one of such bars 127 so that the latch element 128 is operatively connectable with an opposing bar 127 disposed on an opposing case section in the closed position. The latch assembly further includes a release lever 130. Pressure applied to the arm 126 forces a connection of the catch 128 with the bar 127. The release lever 130 provides a mechanical advantage for an operator to overcome the connection forces between the catch 128 and the bar 127 in order to disconnect the latch assembly from an opposing case section so that the case 110 may be moved to an open position. It will be recognized by those of skill in the art that other presently available, suitable latching devices may be substituted to achieve the identical function. Further, it is within the teachings of the present invention, that the latch assembly may be connected to a bar 127 on either the first or second case sections 112, 114 to provide identical function.

The locking members 120 are generally configured as bores 134 formed in each of the first and second case sections 112, 114 in order to provide a passage through which an operator may insert a conventional locking element (not shown). Preferably, the locking element is a padlock which is opened by key or combination. The case 110 may not be moved to the open position without destroying the case 110 if the locking elements are not previously removed.

Figure 6:
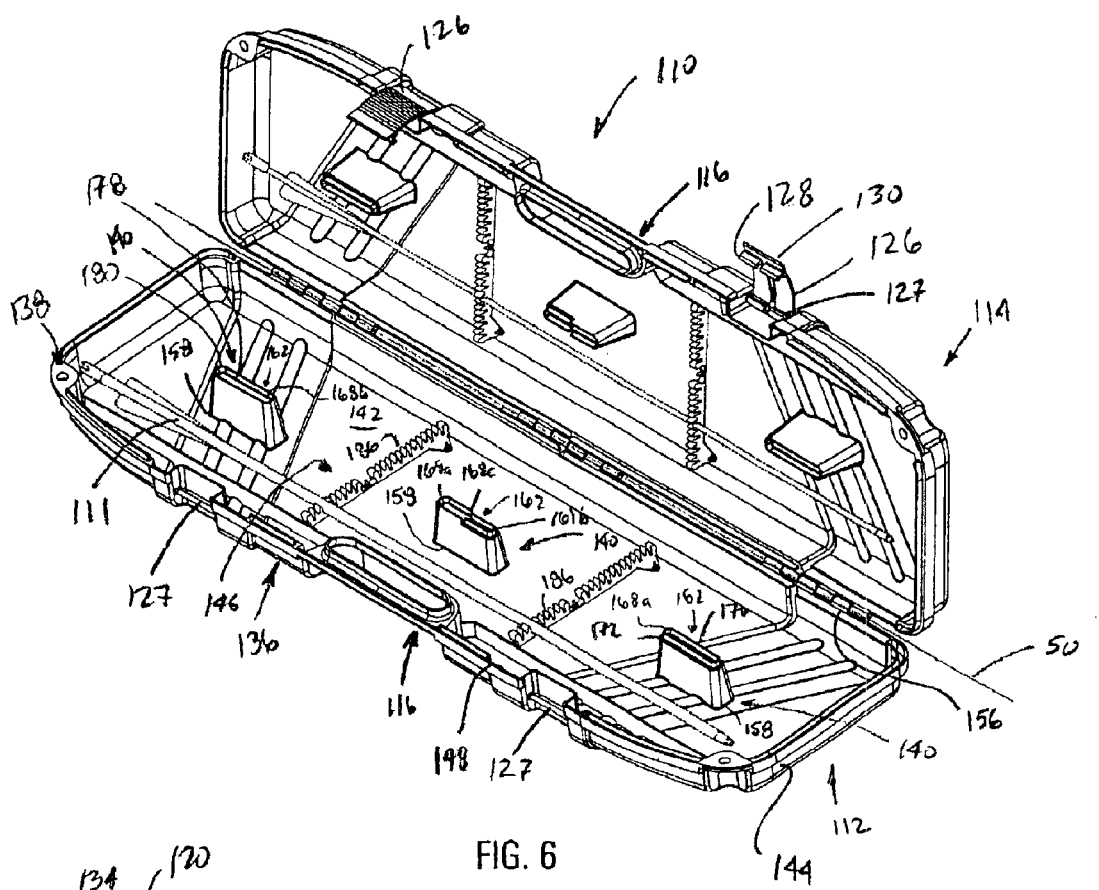
FIG. 6 is a perspective view of another embodiment of the case for archery equipment in an open position constructed in accordance with the principles of the present invention.

As shown in FIG. 6, the first case section 112 generally includes a first wall 136, a first mating rim 138, a hinge line 150 and a plurality of first reinforcing pillars 140. The first wall 136 is formed generally as a shell having a preferably tub-like configuration. An interior surface 142 and an exterior surface 144 cooperate to define the first wall 136 and the thickness thereof. The first wall interior surface 142 defines a first interior recess or cavity 146 which is configured in dimension to receive archery arrows 111 therein.

The first mating rim 138 is formed as a substantially circumferentially extending edge 148 of the first wall 136. The configuration of the first mating rim 138 generally represents the overall outline of the case 110. The first hinge structures 156 are disposed at selected positions on the first mating rim 138 along the hinge line 150. The hinge structures are formed integrally with the first case section 112 and may be configured in any of a number of ways. Snap-fit, projection/receptacle, living and frangibly-created hinges may be fairly substituted as will be recognized by one of skill in the art.

A plurality of reinforcing pillars 140 are shown in FIG. 6. The reinforcing pillars 140 are preferably formed in or integrally molded with the first case section 112. However, it is within the teachings of the present invention that the reinforcing pillars 140 may be formed separately from the first case section 112 and later connected thereto.

Generally, in this embodiment of the present invention, each reinforcing pillar 140 is configured as a substantially hollow, tubular projection. Specifically, in this embodiment of the present invention, each reinforcing pillar 140 has a generally frusto-pyramidal shape which is elongated along a longitudinal axis of the case 110. A base 158 is disposed adjacent the interior surface 142. The reinforcing pillars 140 extend away from the interior surface 142 a certain extent to a free end 162 thereof. Preferably, in this embodiment of the present invention, the reinforcing pillars 140 are also substantially equal in height arid such height is greater than the respective mating rim 138, see FIG. 9, wherein H1 represents the height of reinforcing pillar 140 and H2 represents the height of reinforcing pillar 140'. Each reinforcing pillar 140 on the first case section 112 is disposed within the first interior recess or cavity 146.

The free ends 162 of the reinforcing pillars 140 have different engaging contours 168A, 168B, 168C, formed thereon. A first engaging contour 168A has a first element generally configured as a male reinforcing pillar preferably having a projection 170 which extends away from a shoulder 172 at the free end 162 as described in more detail above with respect to FIGS. 2 and 3.

A second engaging contour 168B has a second element generally configured as a cavity 178 preferably formed in the free end 162 of another reinforcing pillar 140. A shoulder 180 is defined at the free end 162. This type of reinforcing pillar 140 is further described in detail above with respect to FIGS. 2 and 3.

In yet another embodiment of the reinforcing pillar 140, the third engaging contour 168C includes a first element portion 169A and a second element portion 169B which is complimentarily-configured. Both the first and second element portions 169A, 169B are disposed oh a free end 162 of a reinforcing pillar 140. It will be recognized by those of skill in the art that the first element 169A is similar in construction to the first engaging contour 168A and the second element 169B is similar in construction to the second engaging contour 168B. The first and second element portions 169A, 169B of the third engaging contour 168C are disposed juxtaposed on the free end 162 of at least one of the reinforcing pillars 140.

It is within the teachings of the present invention that the first and second element portions 169A, 169B may be disposed on the free end 162 in any proportion that is desired. For example, in this embodiment of the present invention, each of the first and second element portions of the third engaging contour 168C is approximately one-half. Other proportions may be used as desired.

A pair of arrow holders 186 are shown in FIGS. 1, 3 and 4 attached to the second case section 114. Detailed structural and functional features of the holders 186 are shown in FIGS. 4 and 5 and described in connection therewith. It is within the teachings of the present invention that at least one comb member 186 is disposed between any two adjacent reinforcing pillars 140, 140' in each of the first and second case sections 112, 114 and oriented normal to the longitudinal axis of the case.

The second case section 114 is generally a mirror image of the first case section 112. Thus, a detailed discussion of the features of the second case section will be avoided and use of prime element numbers, such as 140' for the plurality of the second reinforcing pillars, will be used in connection with discussion of the second case section 114. It will be recognized by those of skill in the art, however, that there ate several differences in structure which will be discussed in detail below.

Figure 9:
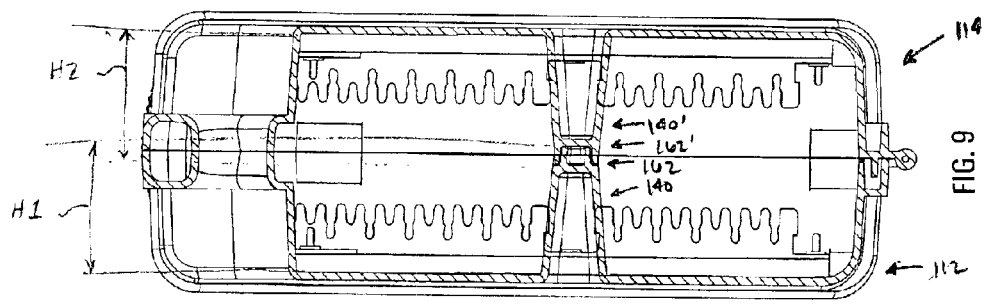
FIG. 9 is a cross-sectional view taken along the lines 9—9 of FIG. 7, illustrating the case in a closed position.
Figure 8:
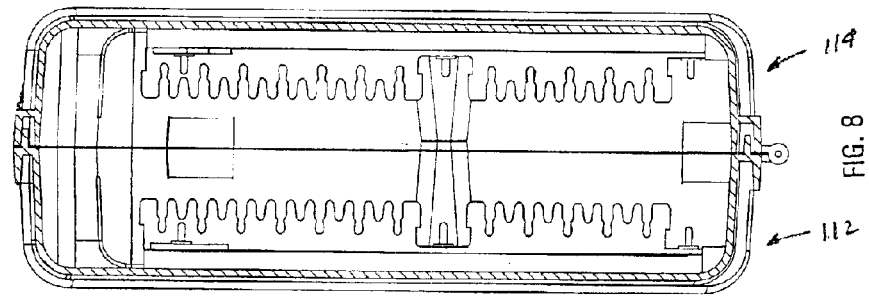
FIG. 8 is a cross-sectional view taken along the lines 8—8 of FIG. 7, illustrating the case in a closed position.
Figure 10:
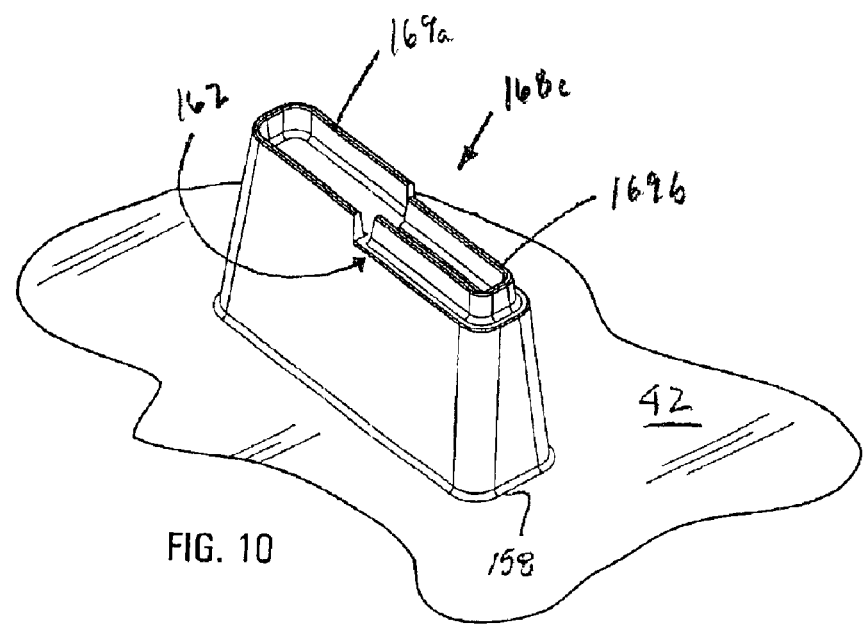
FIG. 10 is a broken-away detailed view of a reinforcing pillar of FIG. 6 constructed in accordance with the principles of the present invention.
Figure 11:
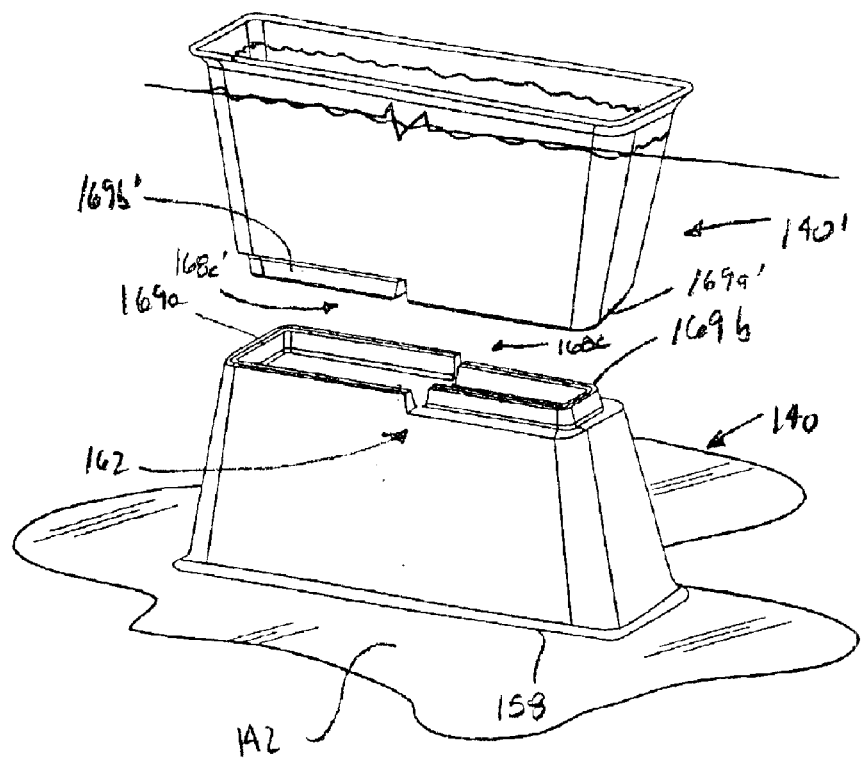
FIG. 11 is a broken-away detailed view of opposing reinforcing pillars of FIG. 6 prior to engagement.

This embodiment of the present invention is designed such that a single mold or tooling fixture may be used in connection with the forming of the first and second case sections 112, 114. Accordingly, when the first and second case sections 112, 114 are joined along the hinge line 150, the engaging pillars 140 of the first case section 112 are configured to engage the reinforcing pillars 140' of the second case section 114 as shown in FIGS. 8 and 9. When the case 110 is disposed in the closed position, each reinforcing pillar 140 affixed to the first case section 112 is aligned with and engages the free end of one of the reinforcing pillars 140' affixed to the second case section.

As discussed above, in this embodiment of the present invention, each set of the reinforcing pillars 140, 140' on the respective first and second case sections 112, 114 each includes at least one reinforcing pillar having an engaging contour with a first element portion and a second element portion. When the first and second case sections 112, 114 are disposed in the closed position, FIGS. 8 and 9, the first element portions are aligned in registry with the second element portions. It is within the teachings of the present invention that the reinforcing pillars 140, 140' having a third engaging contour 168C including first and second element portions are disposed in meshing registry when the respective free ends are aligned in the closed position.

In another embodiment, the reinforcing pillars 140, 140' are disposed and configured such that each of the free end portions 162 of the pillars 140 affixed to the first case section 112 engage one of the free end portions 162' of the pillars 140' affixed to the second case section 114 should define a plurality of engaging pillar sets when the first and second case sections 112, 114 are disposed in the closed position. At least one of the engaging pillars sets in this embodiment includes congruent pillars having both first and second engaging element portions. The plurality of engaging pillar sets is odd in number in such embodiment. It will be recognized by those of skill in the art that a single mold to tooling fixture may be used for production of a case 110 when a single reinforcing pillar includes an engaging contour having first and second element portions. In another embodiment of the present invention, the plurality of the engaging pillar sets is even in number and at least two of the engaging pillars sets have both first and second engaging contour elements.

In use, the case 110 is operated in substantially the same manner as described above, with the exception that the case of the present invention is not configured to receive an archery bow as described, but obviously may be modified to do so if desired.

While the preferred embodiments of the invention have been shown and described, it will be apparent to those skilled in the art that changes and modifications may be made therein without departing from the spirit of the invention, the scope of which is defined by the appended claims.

What is claimed is:

1. A case for storage and transportation of archery equipment, comprising:
   first and second case sections connected for relative movement between open and closed positions;
   the first and second case sections each including a wall cooperatively defining an interior compartment when disposed in the closed position;
   the first and second case sections each including a set of reinforcing pillars affixed thereto which project into the interior compartment when the first and second case sections are disposed in the closed position;
   each reinforcing pillar having a free end such that the free end of each reinforcing pillar affixed to the first case section is aligned with and in abutting relation to the free end of one of the reinforcing pillars affixed to the second case section when the first and second case sections are disposed in the closed position;
   each set of reinforcing pillars on the first and second case sections including at least one reinforcing pillar having an engaging contour including a first element portion and a complementarily-shaped second element portion formed on the free end thereof such that when the first and second case sections are disposed in the closed position, each at least one first element portion disposed on the first and second case sections is aligned and in registry with at least one second element portion disposed on the first and second case sections.

2. The case as recited in claim 1, wherein the reinforcing pillars are integrally molded with the first and second case sections.

3. The case as recited in claim 1, wherein the first and second case sections are hingedly connected for pivotal movement between the open and closed positions.

4. The case recited in claim 1, wherein each set of reinforcing pillars further includes at least one reinforcing pillar having a first contour formed on the free end thereof and at least one reinforcing pillar having a complementarily-shaped second contour formed on the free end thereof such that each first contour is aligned and in registry with one second contour when the first and second case sections are disposed in the closed position.

5. The case as recited as claim 1, wherein the case further includes at least one comb member connected to at least one of the first and second case sections for removably mounting a plurality of arrows.

6. The case as recited in claim 1, wherein the first and second case sections each further include a mating rim disposed at the free end of each wall wherein the mating rim of the first case section includes projecting elements formed thereon and the mating rim of the second case section includes receptacles formed therein such that the projecting elements are aligned and in registry with the receptacles when the first and second case sections are disposed in the closed position.

7. The case as recited in claim 1, wherein the reinforcing pillars each extend from the wall to a height greater than the respective mating rim.

8. The case as recited in claim 1, wherein the reinforcing pillars are substantially equal in height.

9. The case as recited in claim 1, wherein at least one comb member is disposed between any two adjacent reinforcing pillars in each of the first and second case sections oriented normal to a longitudinal axis of the case.

10. The case as recited in claim 1, wherein each reinforcing pillar is elongated along a longitudinal axis of the case.

11. A case comprising:
    first and second case sections connected for movement between open and closed positions and jointly defining an interior compartment when in the closed portion;
    each of said case sections having a reinforcing pillar affixed thereto to project into said compartment when said case sections are in the closed portion;
    each said pillar having a free end configured to define juxtaposed first and second element portions formed on the free end; and
    the pillars of said sections being disposed and oriented such that, when said case sections are in the closed position, the respective free ends thereof are aligned and the first and second element portions are disposed in meshing registry.

12. The case as recited in claim 11, wherein the reinforcing pillars are integrally molded with the first and second case sections.

13. The case as recited in claim 11, wherein the first and second case sections are hingedly connected for pivotal movement between the open and closed positions.

14. The case as recited as claim 11, wherein the case further includes at least one comb member connected to at least one of the first and second case sections for removably mounting a plurality of arrows.

15. The case as recited in claim 11, wherein the reinforcing pillars are substantially equal in height.

16. The case as recited in claim 11, wherein each reinforcing pillar is elongated along the longitudinal axis of the case.

17. A case comprising:
    a first case section and a second case section joined together to move between an open position and a closed position;
    said first and second case sections cooperatively defining an interior compartment when disposed in the closed position;
    a plurality of pillars affixed to each of said first and second case sections to project into the interior compartment when said first and second case sections are disposed in the closed position;

each of said pillars having a free end portion;

said pillars disposed and configured such that each of the free end portions of the pillars affixed to the first case section engage one of the free end portions of the pillars affixed to the second case section to define a plurality of engaging pillar sets when said first and second case sections are disposed in the closed position; and at least one of said plurality of engaging pillar sets including congruent pillars, each pillar having an engaging contour formed in a free end including complementary-shaped first and second element portions.

18. The case as recited by claim 17, wherein said plurality of engaging pillar sets is odd in number.

19. The case recited by claim 17, wherein said plurality of engaging pillar sets is even in number and at least two of said plurality of engaging pillar sets have both first and second element portions.

20. The case recited by claim 17, wherein said plurality of engaging pillar sets having both first and second element portions are elongated along the longitudinal axis of the case.

21. The case recited by claim 17, wherein at least one of said first and second case sections further includes an arrow holder connected thereto.

22. A case comprising:

a first case section and a second case sections joined together to move between an open position and a closed position;

said first and second case sections cooperatively defining an interior compartment when disposed in the closed position; and at least one reversible latch assembly disposed on said first and second case sections, each reversible latch assembly including a pair of parallel bars and a latch removably connected to one of said bars, one of the bars is disposed on each of the said first and second case sections, said latch further including a latch element which is operatively connectable with one of said bars opposite the removable connection with the latch, to retain said first and second case sections in the closed position.

23. The case recited by claim 22, wherein each of the first and second case sections includes a pillar affixed thereto projecting into the interior compartment when said first and second case sections are disposed in the closed position aligned and in registry such that the pillar affixed to the first case section engages the pillar affixed to the second case section.

\* \* \* \* \*

UNITED STATES PATENT AND TRADEMARK OFFICE
CERTIFICATE OF CORRECTION

PATENT NO. : 6,880,698 B2
DATED : April 19, 2005
INVENTOR(S) : Joseph F. Flore, Jr. et al.

It is certified that error appears in the above-identified patent and that said Letters Patent is hereby corrected as shown below:

Column 11,
Line 50, delete "complementarily" replace with -- complementary --

Column 13,
Line 13, delete "complementarily" replace with -- complementary --

Column 14,
Line 2, delete "sections" replace with -- section --

Signed and Sealed this

Twelfth Day of July, 2005

JON W. DUDAS
*Director of the United States Patent and Trademark Office*